United States Patent Office 3,113,948
Patented Dec. 10, 1963

3,113,948
2-(α-OXO ARALKYL) BENZIMIDAZOLE COMPOUNDS, AND PROCESS OF MAKING SAME
Hugo Zellner, Linz (Danube), Upper Austria, Austria, assignor to Donau-Pharmazie Gesellschaft m.b.H., Linz (Danube), Austria, a corporation of Austria
No Drawing. Filed Nov. 21, 1961, Ser. No. 154,039
Claims priority, application Austria Nov. 23, 1960
9 Claims. (Cl. 260—309.2)

The present invention relates to new and valuable 2-(α-oxo aralkyl) benzimidazole compounds and more particularly to such 2-(α-oxo aralkyl) benzimidazole compounds which are substituted in 1-position.

It is one object of the present invention to provide new and valuable 2-(α-oxo aralkyl) benzimidazole compounds which are substituted in 1-position.

Another object of the present invention is to provide a simple and effective process of producing such new and valuable benzimidazole compounds.

A further object of the present invention is to provide highly effective analgesic and spasmolytic benzimidazole compounds.

Other objects of the present invention and advantageous features thereof will become apparent as the description proceeds.

In principle the present invention is concerned with the preparation of 1-substituted 2-(α-oxo aralkyl) benzimidazoles of the following Formula I

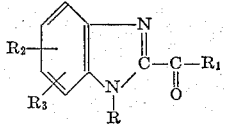

wherein

R is a dialkylamino alkyl group, a monoalkylamino alkyl group, an alkyl radical substituted by a piperidine or morpholine ring, or a hydroxy alkyl group whereby said alkyl radicals are preferably lower alkyl groups;

$R_1$ is an aralkyl residue of Formula II or Formula III

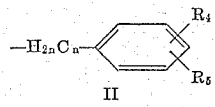

or

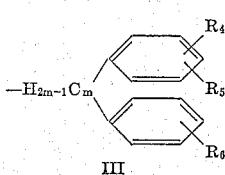

whereby in said Formulas II or III $n$ indicates 0 or an integer from 1 to 4, while $m$ indicates an integer from 1 to 4, said —$C_nH_{2n}$— or —$C_mH_{2m-1}$— radicals being straight chain or branched alkyl radicals; and $R_2$, $R_3$, $R_4$, $R_5$, and $R_6$ are hydrogen, lower alkoxy and especially methoxy and ethoxy groups, the nitro group, the amino group, monoalkylamino and dialkylamino groups and preferably mono- and di-lower alkylamino groups, monoacylamino groups and preferably lower alkanoylamino and benzoylamino groups, halogen and preferably chlorine and bromine or lower alkyl radicals with less than five carbon atoms.

Preferred benzimidazole compounds according to the present invention are such in which the substituent R in 1-position is the dimethylamino ethyl group, the diethylamino ethyl group, the diisopropylamino ethyl group, the piperidino ethyl group, or the morpholino ethyl group and in which $n$ and $m$ of the substituent $R_1$ indicate integers not higher than 3.

Especially valuable compounds according to the present invention are 1-diethylamino ethyl-2-benzoyl benzimidazole,
1-(diethylamino ethyl)-2-(4-methoxy benzoyl) benzimidazole,
1-(diethylamino ethyl)-2-[α-oxo-β-(4-methoxy phenyl) ethyl] benzimidazole,
1-(diethylamino ethyl)-2-(diphenyl acetyl) benzimidazole, and
1-(diethylamino ethyl)-2-[β-phenyl-β-(4-methoxy phenyl) acetyl] benzimidazole.

Benzimidazole compounds which carry a substituent at the nitrogen atom 1 and which are substituted in 2-position by a further substituent having an oxo group, have not been described heretofore. It has been found that these new benzimidazoles are highly effective analgesic and spasmolytic agents. For instance pharmacological tests with 1-(diethylamino ethyl)-2-(benzoyl) benzimidazole hydrochloride have shown that its $LD_{50}$, on intraperitoneal injection in mice, is 530 mg./kg. Its analgesic activity in the phenyl benzoquinone test was determined to $ED_{50}$=200 mg./kg. According to the heat irritation test, said compound, on oral administration, exhibits an analgesic activity about three times higher than that of aminopyrine. The compound has a papaverine-like spasmolytic activity against spasms caused by barium chloride which is about 1.5 times as strong as that of papaverine. The spasmolytic activity against citrated calcium cyanamide (CCC) and histamine is rather low. The compound has a slight blood pressure lowering effect on intravenous administration to cats and rabbits. Said blood pressure lowering effect is about half that of papaverine. The compound has no noteworthy anticonvulsive activity against electroshock treatment. Its respiration suppressing effect is about one third of that of morphine on administering the same effective dose.

1-(diethylamino ethyl)-2-(4-methoxy benzoyl) benzimidazole hydrochloride has a toxicity of $LD_{50}$=560 mg./kg. on intraperitoneal administration to mice. The $ED_{50}$ in the phenyl benzoquinone test is 150 mg./kg., orally administered. The analgesic activity determined according to the heat irritation test is about 4.5 times that of aminopyrine. Its spasmolytic activity against spasms caused by barium chloride is 1.9 times that of papaverine. Its other pharmacological properties correspond to those of 1-(diethylamino ethyl)-2-(benzoyl) benzimidazole hydrochloride.

The $LD_{50}$ of 1-(diethylamino ethyl)-2-(diphenyl acetyl) benzimidazole hydrochloride, on intraperitoneal administration to mice was found to be 250 mg./kg. Its $ED_{50}$, determined by the phenyl benzoquinone test, is 118 mg./kg. Its analgesic activity determined by the heat irritation test is about 2.5 times that of aminopyrine. Its spasmolytic activity against spasms caused by barium chloride is twice that of papaverine. The other pharmacological properties of this compound correspond to those of the above mentioned compounds.

The new 2-(α-oxo aralkyl) benzimidazoles substituted in 1-position, of Formula I, can be obtained, for instance, by oxidizing 2-(α-hydroxy aralkyl) benzimidazoles of Formula IV

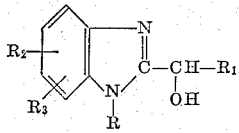

IV wherein R, $R_1$, $R_2$, and $R_3$ represent the same substituents as indicated above and whereby R may also be hydrogen, by the action of oxidizing agents which are capable of oxidizing secondary alcohol groups into keto groups, to the corresponding α-oxo compounds. If R is hydrogen, the alkylamino group or the hydroxy alkyl group is subsequently introduced in 1-position.

An especially suitable oxidizing agent for converting 1-substituted 2-(α-hydroxy aralkyl) benzimidazoles into the corresponding α-oxo compounds is chromic acid. In some instances oxidation may also be effected by means of dicyano dichloro benzoquinone, according to the method of Oppenauer by reaction with ketones and catalysts such as aluminum isopropylate, by means of permanganates, selenium dioxide, manganese dioxide, lead dioxide, or lead tetra-acetate.

The starting materials, the 2-(α-hydroxy aralkyl) benzimidazoles are prepared, for instance, according to the method described by M. Phillips in "Journ. Chem. Soc.," 1928, page 2393, by reacting the corresponding mandelic acids with O-phenylene diamine.

Selective $N_1$-alkylation of 2-(α-hydroxy aralkyl) benzimidazole is a disadvantageous procedure because the alkyl group is introduced not only at the nitrogen atom 1 but also into the α-hydroxyl group and an equilibrium between the mono-substituted and the disubstituted compounds is established so that mixtures of such substitution products are found. In contrast thereto subsequent $N_1$-alkylation of the 2-(α-oxo aralkyl) benzimidazole compounds permits the production of the desired new compounds in yields between about 60% and about 80%.

According to a preferred embodiment of the present invention alkylamino alkylation or hydroxy alkylation in 1-position of the benzimidazole is effected by reaction with the corresponding dialkylamino alkyl halogenide, monoalkylamino alkyl halogenide, or hydroxy alkyl halogenide with the addition of agents capable of splitting off and binding hydrogen halide, such as potassium carbonate, pyridine, dimethyl aniline, or other tertiary bases.

According to another advantageous embodiment of the present invention 1-(hydroxy alkyl)-2-(α-hydroxy aralkyl) benzimidazoles are oxidized to the corresponding 1-(hydroxy alkyl)-2-(α-oxo aralkyl) benzimidazoles which are halogenated, thereby replacing the hydroxyl group by halogen, and are then reacted with suitable amines to yield the desired 1-(dialkylamino alkyl)- or 1-(monoalkylamino alkyl)-2-(α-oxo aralkyl) benzimidazoles.

It is also possible first to oxidize 2-(α-hydroxy aralkyl) benzimidazoles which are unsubstituted in 1-position to the corresponding 1-unsubstituted 2-(oxo aralkyl) benzimidazoles, then to react said oxo compounds with aliphatic halogen alcohols to yield the 1-(hydroxy alkyl)-2-(α-oxo aralkyl) benzimidazoles, whereafter the hydroxyl group of the substituent in 1-position is halogenated and the resulting 1-halogeno alkyl compound is finally converted into the 1-(dialkylamino alkyl)-2-(α-oxo aralkyl) benzimidazoles by reaction with suitable amines.

The 1-(piperidino alkyl)- or, respectively, 1-(morpholino alkyl)-2-(α-oxo aralkyl) benzimidazoles are preferably obtained by reacting 1-(halogeno alkyl)-2-(α-oxo aralkyl) benzimidazoles with piperidine or, respectively, morpholine.

The following examples serve to illustrate the present invention without, however, limiting the same thereto.

*Example 1.—1-(Diethylamino Ethyl)-2-(Benzoyl) Benzimidazole*

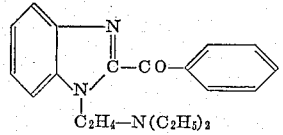

(a) 1-(diethylamino ethyl)-2-(α-hydroxy benzyl) benzimidazole. This compound is prepared by reacting the imino ether hydrochloride of mandelic acid nitrile with N-diethylamino ethyl-o-phenylene diamine. The iminoether of mandelic acid nitrile is prepared according to Knorr "Ber. Dtsch. Chem. Ges.," vol. 37, page 3173, from mandelic acid nitrile and equimolecular amounts of absolute ethanol and gaseous hydrogen chloride in dioxane solution.

The resulting 1-(diethylamino ethyl)-2-(α-hydroxy benzyl) benzimidazole is used without further purification in the next reaction step.

(b) 65 g. of 1-(dimethylamino ethyl)-2-(α-hydroxy benzyl benzimidazole are dissolved in dilute sulfuric acid (20 g. of concentrated sulfuric acid and 150 cc. of water). The solution of 14 g. of chromic acid anhydride in 50 cc. of water and 20 g. of sulfuric acid as well as 50 cc. of glacial acetic acid are added drop by drop to said solution while shaking. The mixture is heated on the water bath for 4 hours. Thereby the initially yellow color of the solution changes to dark green. The cooled solution is rendered strongly alkaline by the addition of concentrated sodium hydroxide solution. The alkaline solution is shaken with dichloro methane. In order to facilitate separation of the dichloro methane layer, the precipitated chromium hydroxides are filtered off by suction. The filter residue is repeatedly washed with dichloro methane. The combined dichloro methane solutions are shaken several times with dilute hydrochloric acid (1 part of concentrated hydrochloric acid and 3 parts of water). The combined hydrochloric acid solutions are rendered alkaline by the addition of ammonia, while cooling with running water. The alkaline solution is again extracted with dichloro methane. The resulting dichloro methane solutions are dried over sodium sulfate and the solvent is distilled off therefrom. The remaining viscous, yellow oil is distilled in a vacuum at 184–186° C./0.15 mm. Hg. It solidifies in crystalline form after a short period of time. The yield is 38 g.

On dissolving the resulting base is isopropanol and adding the calculated amount of alcoholic hydrochloric acid, the hydrochloride of 1-(diethylamino ethyl)-2-(benzoyl) benzimidazole of the melting point 216° C. is obtained in the form of pure white crystals.

*Example 2.—1-(Diethylamino Ethyl)-2-(Benzoyl) Benzimidazole, Also Designated as 1-(Diethylamino Ethyl)-2-(α-Oxo Benzyl) Benzimidazole*

(a) 2-benzoyl benzimidazole. 112 g. of 2-(α-hydroxy benzyl) benzimidazole, prepared by reacting mandelic acid and o-phenylene diamine are dissolved in 500 cc. of glacial acetic acid while heating gently.

48 cc. of chromic acid anhydride are heated in 400 cc. of glacial acetic acid and are dissolved by the addition of a small amount of water. The chromic acid solution is then added slowly drop by drop to the solution of the benzimidazole compound at an initial temperature of about 40° C. while stirring vigorously. After the addition is completed, the mixture is heated to boil for a few minutes and is then poured in 2 l. of water. After standing for 12 hours, the α-keto benzimidazole is filtered off by suction and is washed with large quantities of water. On recrystallization from about 1 l. of glacial acetic acid and subsequent recrystallization from dioxane, 92 g. of 2-benzoyl benzimidazole are obtained by the addition of a small quantity of water in the form of white needles of the melting point: 215–216° C.

(b) 1-(diethylamino ethyl)-2-(benzoyl) benzimidazole. 55 g. of 2-benzoyl benzimidazole are boiled under reflux in 200 cc. of xylene with 36 g. of diethylamino ethyl chloride and 70 g. of calcined, finally pulverized potassium carbonate for 7 hours. The reaction mixture is cooled and poured in water. The xylene layer is separated and the aqueous layer is shaken twice with 100 cc. of xylene. The combined xylene solutions are stirred with dilute hydrochloric acid (1 part of concentrated hydrochloric acid and 3 parts of water). Immediately, a thick white crystalline paste is obtained which is filtered off by suction from the mixture of xylene and hydrochloric acid. The aqueous hydrochloric acid layer is separated and concentrated by evaporation. The hydrochloride obtained in this manner is combined with the main portion of the crystals. On repeated recrystallization of the hydrochloride from dioxane diluted with large amounts of water whereby a few drops of hydrochloric acid are added during the first recrystallization step, the hydrochloride of 1-(diethylamino ethyl)-2-(benzoyl) benzimidazole of the melting point: 215–216° C. is obtained in the form of white needles. The compound shows a melting point depression of 50° C. when mixed with the starting material, the 2-(benzoyl) benzimidazole hydrochloride. Yield: 53 g.

On suspending the hydrochloride in concentrated ammonia, shaking the liberated base with benzene, drying the benzene solution, and distilling off the solvent, there is obtained, on subsequent distillation, the free 1-(diethylamino ethyl)-2-(benzoyl) benzimidazole in the form of a yellow oil of the boiling point 186° C./0.15 mm. Hg. The oil crystallizes after standing for a short period of time and can be recrystallized from isopropanol. Yield: 59.8% of the theoretical yield.

*Example 3.—1-(Diethylamino Ethyl)-2-(4-Methoxy Benzoyl) Benzimidazole*

(a) 2-(α-hydroxy-4-methoxy benzyl) benzimidazole is prepared by reacting the imino ether hydrochloride of 4-methoxy mandelic acid nitrile with o-phenylene diamine. The 4-methoxy mandelic acid nitrile itself is obtained by reacting anisaldehyde, sodium bisulfite, and sodium cyanide.

94 g. of the resulting 2-(α-hydroxy-4-methoxy benzyl) benzimidazole are dissolved in 250 cc. of glacial acetic acid. 35.5 g. of chromic acid anhydride are boiled in 100 cc. of glacial acetic acid and are dissolved by the addition of a small quantity of water. The hot chromic acid solution is added drop by drop to the solution of the benzimidazole while stirring vigorously. After the addition is completed and the exothermic reaction has subsided, the mixture is heated to boiling for a few minutes. The solution is then poured into 4 liters of cold water. The precipitated crude compound is purified by a single recrystallization from dioxane. Its melting point is 195–196° C. The yield of 2-(4-methoxy benzoyl) benzimidazole is 72 g.

(b) 42 g. of the 2-(4-methoxy benzoyl) benzimidazole obtained as described under (a) are boiled under reflux with the addition of 25 g. of freshly distilled diethylamino ethyl chloride in 200 cc. of xylene with 55 g. of finely pulverized, calcined potassium carbonate for 7 hours. The cooled mixture is poured in 250 cc. of water and the xylene layer is separated. The xylene solution is shaken several times with dilute hydrochloric acid (1 part of concentrated hydrochloric acid and 4 parts of water). The combined hydrochloric acid extracts are rendered alkaline by the addition of concentrated ammonia while cooling with water. The resulting upper layer of oil is extracted by shaking with benzene and the combined benzene solutions are dried over potassium carbonate. On distilling off the solvent, a viscous yellow oil remains. Yield: 51 g. corresponding to 87% of the theoretical yield.

The crude base is dissolved in isopropanol and 42 cc. of 3.54 N absolute alcoholic hydrochloric acid are added thereto. The hydrochloride of 1-(diethylamino ethyl)-2-(4-methoxy benzoyl) benzimidazole immediately precipitates in the form of long white needles. On recrystallization from isopropanol with the addition of a small quantity of water, the compound has a melting point of 218° C.

*Example 4.—1-(Diethylamino Ethyl)-2-(4-Methoxy Benzoyl) Benzimidazole*

(a) 1-(Diethylaminoethyl)-2-(α-hydroxy-4-methoxy benzyl) benzimidazole. The base is prepared by reacting 4-methoxy mandelic acid imino ether hydrochloride with N-(diethylamino ethyl)-o-phenylene diamine. It is purified by conversion into its hydrochloride of the melting point: 242–244° C., liberating therefrom the base by the addition of ammonia, and removing the solvent (methylene chloride) by vacuum distillation.

(b) 17.6 g. of 1-(diethyl amino ethyl)-2-(α-hydroxy-4-methoxy benzyl) benzimidazole are dissolved in 40 cc. of water and 10 cc. of concentrated sulfuric acid. A solution of 3.5 g. of chromic acid anhydride in 10 cc. of water is added at once. 10 cc. of glacial acetic acid are then added to the mixture. (When allowing the resulting solution to stand, cluster-like yellow crystal druses are formed which represent the chromate of the base.)

The solution is then slowly heated to boiling and is boiled for 20 minutes, whereby the color gradually changes to dark green. To complete the reaction, the solution is heated on the water bath for one more hour. The cooled, dark green solution is rendered alkaline by the addition of strong sodium hydroxide solution and is shaken with dichloro methane. To facilitate separation of the dichloro methane layer, the precipitated chromium hydroxides are removed by suction filtration. The filter residue is stirred with concentrated aqueous sodium hydroxide solution, is again shaken with dichloro methane, and is filtered by suction. The combined dichloro methane extracts are washed with water and are then shaken twice with a small quantity of dilute hydrochloric acid (1 part of concentrated hydrochloric acid and 1 part of water). The combined hydrochloric acid solutions are rendered alkaline by the addition of ammonia while cooling with water and the alkaline solutions are extracted with dichloro methane. The combined dichloro methane solutions are dried over potassium carbonate and the solvent is distilled off.

The remaining viscous, yellow oil can be purified by distillation in a vacuum of 0.1 mm. Hg. The clear yellow oil obtained in this manner is dissolved in isopropanol. Absolute alcoholic hydrochloric acid is added drop by drop to said solution until a sample thereof exhibits strongly acid reaction. After cooling, the precipitated hydrochloride of the base is recrystallized from isopropanol and a small quantity of water. Pure white needles of the melting point 217–218° C. are obtained. Yield 16.8 g. corresponding to 86% of the theoretical yield.

*Example 5.—1-(Diethylamino Ethyl)-2-[α-Oxo-β-(4-Methoxy phenyl) Ethyl] Benzimidazole or, Respectively, 1-(Diethylamino Ethyl)-2-(4-Methoxy Phenyl Acetyl) Benzimidazole*

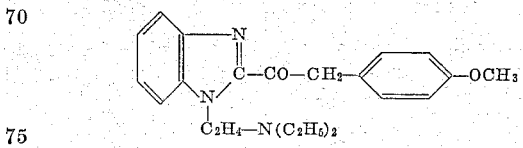

(a) 2-[α-hydroxy-β-(4-methoxy phenyl) ethyl] benzimidazole

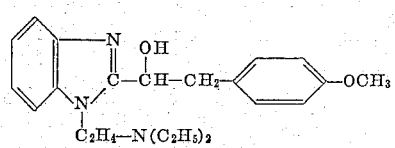

This compound is prepared, for instance, by glycide ester synthesist from anisaldehyde and monochloro acetic acid ethyl ester which yields 4-methoxy phenyl acetaldehyde, conversion of said aldehyde into its bisulfite compound, reacting said compound with hydrocyanic acid to yield 4-methoxy phenyl lactic acid nitrile of the formula

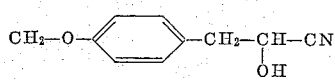

and converting said nitrile by reaction with absolute alcohol and gaseous hydrochloric acid in dioxane solution into the imino ether hydrochloride.

The solution of the imino ether hydrochloride in dioxane obtained, for instance, from 110 g. of 4-methoxy phenyl lactic acid nitrile, is reacted with 80 g. of o-phenylene diamine in 400 cc. of dioxane. After the initially vigorous reaction has subsided, the mixture is heated in the water bath for 5 hours. The dioxane solution is poured into 4 l. of water and is rendered alkaline by the addition of ammonia. The precipitated fine crystals are filtered off by suction, repeatedly washed with warm water, and then recrystallized from 5.3 l. of 96% ethanol. The yield, when starting with 110 g. of 4-methoxy phenyl lactic acid nitrile amounts to 108 g. of fine white crystalline needles of the melting point 243–244° C.

(b) 2-(4-methoxy phenyl acetyl) benzimidazole. 107 g. of the 2-[α-hydroxy-β-(4-methoxy phenyl)ethyl]benzimidazole obtained as described under (a) are dissolved in 200 cc. of glacial acetic acid. 20 cc. of concentrated sulfuric acid dissolved in 100 cc. of water are added to said solution. 28 g. of chromic acid anhydride are heated to boiling in 100 cc. of glacial acetic acid and are brought into the solution by the addition of a small quantity of water. Both solutions are cooled and the chromic acid solution is added to the solution of the benzimidazole compound slowly while stirring. Exothermic reaction sets in. After the reaction has subsided, the mixture is heated on the water bath for 1 hour.

The cooled dark green solution is poured on 1 l. of ice water. After standing for some time, the crude 2-(4-methoxy phenyl acetyl) benzimidazole is filtered off by suction, thoroughly washed with water, and dried over sulfuric acid in a vacuum. The crude product can be used without further purification for the next reaction step.

(c) 53 g. of the crude 2-(4-methoxy phenyl acetyl) benzimidazole are boiled under reflux in 250 cc. of xylene with 30 g. of freshly distilled diethylamino ethyl chloride and 50 g. of calcined, finely pulverized potassium carbonate for 7 hours. The cooled solution is poured into 100 cc. of water. The xylene layer is separated, shaken with dilute hydrochloric acid (1 part of concentrated hydrochloric acid and 4 parts of water), the hydrochloric acid solution is rendered alkaline by the addition of ammonia while cooling with water, and the liberated base is extracted by repeated shaking with benzene. The benzene solutions are dried over sodium sulfate, the solvent is distilled off, and the residue is distilled in a vacuum.

The resulting 1-(diethylamino ethyl)-2-[α-oxo-β-(4-methoxyphenyl)ethyl]benzimidazole is obtained on repeated distillation in a vacuum in the form of a yellow oil of the boiling point 198–205° C. (temperature of the air bath) under a pressure of 0.03 mm. Hg. Yield: 61 g. corresponding to 83% of the theoretical yield.

*Example 6.—1-(Diethylamino Ethyl)-2-[α-Oxo-β-(4-Methoxy Phenyl)Ethyl]Benzimidazole*

(a) 1-(diethylamino ethyl)-2-[α-hydroxy-β-(4-methoxy phenyl)ethyl]benzimidazole. 4-methoxy phenyl acetaldehyde is converted by way of its bisulfite compound into the 4-methoxy phenyl lactic acid nitrile after following the procedure described in Example 5. The imino ether hydrochloride is obtained from said nitrile while introducing dry gaseous hydrochloric acid into a dioxane solution of said nitrile after the addition of the calculated amount of absolute ethanol. A solution of 160 g. of N-diethylamino ethyl-o-phenylene diamine in 100 cc. of dioxane is added to the solution of the imino ether hydrochloride obtained from 110 g. of 4-methoxy phenyl lactic acid nitrile and 28.5 g. of absolute ethanol in 150 cc. of dioxane by introduction of dry gaseous hydrochloric acid while cooling. After the very vigorous initial reaction has subsided, the mixture is heated in the water bath for four hours. The cooled mixture is poured on 1 l. of water and is rendered alkaline by the addition of ammonia. The liberated base is extracted by repeated shaking with dichloro methane. The combined dichloro methane solutions are three times extracted by shaking with dilute hydrochloric acid (1 part of concentrated hydrochloric acid and 2 parts of water). The combined hydrochloric acid extracts are rendered alkaline by the addition of ammonia while cooling thoroughly. The liberated base is extracted with dichloro methane. Small amounts of white flakes which precipitate thereby are removed by filtration.

The dichloro methane solution is dried over sodium sulfate and the solvent is distilled off therefrom. After repeated distillation of the residue by using a small fractionating column, 104 g. of a viscous, light yellow oil of the boiling point 187–189° C./0.03–0.05 mm. Hg are obtained. The yield amounts to 49.5% of the theoretical yield.

(b) 1-(diethylamino ethyl)-2-[α-oxo-β-(4-methoxy phenyl)ethyl]benzimidazole. 84 g. of 1-(diethylamino ethyl)-2-[α-hydroxy-β-(4-methoxy phenyl)ethyl]benzimidazole are dissolved in 250 cc. of glacial acetic acid. The solution is cooled. A solution of 18 g. of chromic acid anhydride in 150 cc. of glacial acetic acid and 5 cc. of water is added thereto. After addition is completed, stirring is continued whereby the cooling bath is removed. After standing overnight, the mixture is heated on the water bath for 2 hours. The resulting dark green solution is poured in 1 l. of water and shaken with about 250 cc. of dichloro methane. Concentrated sodium hydroxide solution is added to said mixture while cooling until it has been rendered strongly alkaline. The dichloro methane layer is separated. Separation is facilitated by preceding filtering off by suction of the chromium hydroxides. The alkaline solution is extracted three times with dichloro methane. The filtered chromium hydroxides are slurried in sodium hydroxide solution and the slurry is also extracted three times with dichloro methane. The combined dichloro methane solutions are shaken with dilute hydrochloric acid (1 part of concentrated hydrochloric acid and 2 parts of water). The combined hydrochloric acid extracts are rendered alkaline by the addition of ammonia and the liberated bases are again extracted with dichloro methane. After separating the dichloro methane solution and distilling off the solvent, the oily residue is distilled three times. 1-(diethylamino ethyl)-2-[α-oxo-β-(4-methoxy phenyl)ethyl]benzimidazole is obtained as a yellow oil of the boiling point 198–202° C. (temperature of the air bath) at a pressure of 0.025 mm. Hg. The yield amounts to 41 g. corresponding to 49% of the theoretical yield.

*Example 7*

(a) 29.8 g. of 2-(β-diphenyl ethyl) benzimidazole, prepared by condensing γ-diphenyl propionic acid with o-phenylene diamine in 4 N hydrochloric acid and purification by sublimation at 150–170° C./0.01 mm. Hg, melting point 156–158° C., are boiled under reflux in 150 cc. of nitro benzene with 11.1 g. of selenium dioxide for four days, each day for ten hours while standing without heating each day for fourteen hours. Precipitated selenium is filtered off. The nitro benzene is removed by distillation in a vacuum. The residue is dissolved in concentrated hydrochloric acid, the solution is filtered, diluted with five times its volume of water, and just rendered alkaline by the addition of ammonia. The precipitated base is separated. On recrystallizing the base twice from isopropanol, 2-(diphenyl acetyl) benzimidazole is obtained with a melting point of 218.5–219.5° C. The yield is 26 g.

(b) 36.5 g. of 2-(diphenyl acetyl) benzimidazole, 17 g. of diethylamino ethyl chloride, 24 g. of dry, finely pulverized potassium carbonate, and 300 cc. of toluene are mixed and the mixture is boiled under reflux for 8 hours. The salts produced thereby are filtered off by suction. The toluene is distilled off. The remaining base is distilled in a vacuum. The resulting 1-(diethylamino ethyl)-2-(diphenyl acetyl) benzimidazole boils at 230° C./0.1–0.3 mm. Hg (in an air bath). The very viscous oil is dissolved in isopropanol and the pH-value is adjusted to a pH of about 1.0 by the addition of aqueous hydrochloric acid. The crude product has a melting point of 212–214° C. On recrystallization from isopropanol, its melting point is increased to 218–220° C. The yield of 1-(diethylamino ethyl)-2-(diphenyl acetyl) benzimidazole hydrochloride is 42 g.

*Example 8.—1-(Diethylamino Ethyl)-2-(Diphenyl Acetyl) Benzimidazole*

(a) 31.4 g. of 2-(β-diphenyl-α-hydroxy ethyl) benzimidazole, prepared by condensing β-diphenyl lactic acid with o-phenylene diamine in 4 N hydrochloric acid, are boiled under reflux with 30 g. of 2,3-dichloro-5,6-dicyano benzoquinone-1,4 in 150 cc. of dioxane for four days, each day for ten hours while standing without heating each day for fourteen hours. The cooled solution is filtered to separate crystallized 2,3-dichloro-5,6-dicyano hydroquinone-1,4. The remaining solution is shaken with decolorizing carbon, filtered, and concentrated by evaporation. The precipitated base is recrystallized from ethanol. 29.3 g. of 2-(diphenyl acetyl) benzimidazole of the melting point 218.5–219° C. are obtained.

(b) Alkylation is effected as described in Example 7, yielding the same benzimidazole compound.

*Example 9.—1-(Diethylamino Ethyl)-2-[Phenyl-(4-Methoxy Phenyl) Acetyl]Benzimidazole*

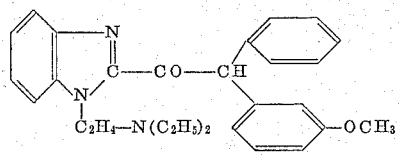

44.3 g. of 1-(diethylamino ethyl)-2-[β-phenyl-β-(4-methoxy phenyl)-α-hydroxy ethyl]benzimidazole, prepared by condensing β-phenyl-β-(4-methoxy phenyl) lactic acid with N-diethylamino ethyl-o-phenylene diamine in 4 N hydrochloric acid and purifying the base by distillation in a vacuum, are boiled under reflux with 32 g. of 2,3-dichloro-5,6-dicyano benzoquinone-1,4 in 200 cc. of dioxane for 36 hours. Crystallized 2,3-dichloro-5,6-dicyano hydroquinone-1,4 is filtered off from the cold solution. The filtrate is decolorized by the addition of decolorizing carbon, filtered, and freed by distillation of most its solvent content. The residue is rendered alkaline by the addition of ammonia. The base is extracted with dichloro methane. The dichloro methane solution is shaken with hydrochloric acid (1:1). The resulting acid solution is render alkaline by the addition of ammonia and is extracted with dichloro methane. After distilling off the solvent, the base is distilled in a vacuum. Boiling point: 245° C./0.05 mm. Hg (in an air bath). The resulting oil is dissolved in isopropanol and the solution is adjusted to a pH-value of about 1.0 by the addition of hydrochloric acid. The precipitated crystals are recrystallized from isopropanol. The resulting 1-(diethylamino ethyl)-2-[β-phenyl-β-(4-methoxy phenyl) acetyl]benzimidazole has a melting point of 197–199° C.

In place of 1-(diethylamino ethyl)-2-(α-hydroxy benzyl) benzimidazole used in Example 1 as starting material, there may be employed equimolecular amounts of 2-(α-hydroxy benzyl) benzimidazole compounds which carry in 1-position one of the following groups:

Dimethylamino ethyl,
Di-isopropylamino ethyl,
Piperidino ethyl,
Piperidino n-propyl,
Morpholino ethyl, and others while otherwise the procedure is the same as described in said Example 1. The starting materials are also obtained in an analogous manner by reacting the imino ether hydrochloride obtained from mandelic acid nitrile with the corresponding N-dimethylamino ethyl-, N-di-isopropylamino ethyl-, piperidino ethyl-, piperidino n-propyl-, morpholino ethyl-o-phenylene diamine and the like compounds.

Likewise, in place of diethylamino ethyl chloride used as the one reaction component in Example 2(b), there may be employed equimolecular amounts of dimethylamino ethyl chloride, di-isopropylamino ethyl bromide, di-n-butylamino ethyl chloride, di-isoamylamino-n-propyl chloride, piperidino ethyl bromide, piperidino-n-propyl chloride, morpholino ethyl chloride, and others, while otherwise the procedure is the same as described in said Example 2(b).

In place of the imino ether hydrochloride of p-methoxy mandelic acid nitrile as used in Examples 3 and 4(a), there may be employed equimolecular amounts of imino ether hydrochlorides of other substituted mandelic acid nitriles, such as 4-nitro mandelic acid nitrile,
4-amino mandelic acid nitrile,
3-methylamino mandelic acid nitrile,
3-diethylamino mandelic acid nitrile,
4-acetylamino mandelic acid nitrile,
4-benzoylamino mandelic acid nitrile,
3-methyl mandelic acid nitrile and others while otherwise the procedure is the same as described in said Examples 3(a) or 4(a).

Likewise, in place of o-phenylene diamine used as starting material in Examples 2(a) and 3(a), there may be employed substituted o-phenylene diamines, such as 4-nitro-o-phenylene diamine,
4-chloro-o-phenylene diamine,
4-methyl-o-phenylene diamine, and others, while otherwise the procedure is the same as described in Examples 2(a) and 3(a).

It is also possible to use in place of 4-methoxy phenyl lactic acid nitrile of Example 5(a), equimolecular amounts of (4-nitro phenyl)lactic acid nitrile,
(4-amino phenyl)lactic acid nitrile,
(4-chloro phenyl)lactic acid nitrile, and introduction of gaseous hydrogen chloride in the cooled solution up to saturation. The imino ether hydrochloride crystallizes after introducing the hydrogen chloride for a short time.

For the reaction with 207 g. N-diethylamino ethyl phenylene diamine the crude imino ether hydrochloride as obtained may be used. A solution of the selected o-phenylene diamine in an inert solvent (400 ml. xylene) is heated for 1 hour in a water bath and for 5 hours under reflux. The obtained mixture is extracted with dilute hydrochloric acid (1 part concentrated hydrochloric acid and 1 part of water). The aqueous hydrochloric acid layer is separated, diluted with water and rendered alkaline by the addition of ammonia. The alkaline solution is extracted with dichloro methane. The resulting dichloro methane solution is washed with water, dried over sodium sulfate and the solvent is distilled off therefrom. The remaining 1-(diethylamino ethyl)-2-(α-hydroxy-p-methoxy benzyl) benzimidazole gives a hydrochloride having a melting point of 244° C. (decomp.). Yield: 95 g.

The starting materials, the 2-(α-hydroxy aralkyl) benzimidazoles, may also be obtained by reacting selected mandelic acids (A) and o-phenylene diamines (B) in the following manner:

The selected mandelic acid is prepared by boiling the corresponding mandelic acid nitrile with an excess of an aqueous potassium hydroxide solution (10 parts KOH and 100 parts of water) and acidification with dilute hydrochloric acid after ceasing of ammonia evolution. The obtained mandelic acid is boiled under reflux with an equimolecular amount of the selected o-phenylene diamine (B) in 4 N hydrochloric acid (C) for a period (D) from 1 to 12 hours. The base is separated from the obtained acid solution in the manner as described above in connection with 1-(diethylamino ethyl)-2-(α-hydroxy-p-methoxy benzyl) benzimidazole. Specific examples for the components (A) and (B) as well as for the conditions of the reaction are given in Table I; melting points of the bases as obtained and the yields are also listed:

The new compounds form acid addition salts not only with hydrochloric acid as described, for instance, in the examples but also with other inorganic or organic acids, such as hydrobromic acid, sulfuric acid, phosphoric acid, succinic acid, maleic acid, malonic acid, citric acid, tartaric acid, malic acid, benzoic acid, salicylic acid, nicotinic acid, and others. Such acid addition salts are prepared according to methods known per se.

The new compounds are preferably orally administered, for instance, in amounts of about 20 to 100 g. daily. Single doses containing up to about 50 mg. of the active benzimidazole compound according to the invention may be used. The new compounds may be administered as hydrochlorides or other acid addition salts in the form of tablets, pills, dragees, or in other solid and shaped form, or in powder form whereby they are preferably enclosed in gelatin capsules. They are preferably not used in their original form but in diluted form, thus, allowing better and more economical use to be made thereof.

When preparing tablets, pills, dragees and the like preparations, the commonly used diluting agents, binders, and the like additions are employed, such as sugar, lactose, talcum, starch, bolus alba, and as binders, pectin, gelatin, gum arabic, methyl cellulose, yeast extract, agar, tragacanth and others.

They may also be used in the form of solutions or suspensions in sterile distilled water or isotonic saline solution for parenteral administration.

Rectal administration in the form of suppositories is also effective.

Of course many changes and variations in the composition of the new benzimidazole compounds and their acid addition salts, in the methods of producing said com-

TABLE I

| A | B | C, cm.$^3$ | D, hours | bases obtained | melting point | yield, g. |
|---|---|---|---|---|---|---|
| 112 g. mandelic acid | 100 g. 1,2-diamino-4-methoxy benzene. | 1,100 | 4 | 2-(α-hydroxy-benzyl)-5(6)-methoxy benzimidazole. | 169 to 170° C | 98 |
| 35.2 g. p-dimethylamino mandelic acid. | 25 g. 1,2-diamino-4-methoxy benzene. | 300 | 4 | 2-(4'-dimethylamino-α-hydroxy benzyl)-5(6)-methoxy benzimidazole. | 233 to 238° C. (decomp.). | 18 |
| 65 g. p-methoxy phenyl lactic acid. | 46 g. 1,2-diamino-4-methoxy benzene. | 400 | 4 | 2-[(4'-methoxy phenyl)-α-hydroxy ethyl-5(6)-methoxy] benzimidazole. | 248 to 253 °C | 49 |
| 70 g. p-chloro mandelic acid | 53 g. 1,2-diamino-4-methoxy benzene. | 600 | 5 | 2-(4'-chloro-α-hydroxy benzyl)-5(6)-methoxy benzimidazole. | 215 to 217° C. (decomp.). | 55 |
| 16 g. p-dimethylamino mandelic acid. | 9 g. o-phenylene diamine. | 250 | 5 | 2-(4'-dimethylamino-α-hydroxy benzyl) benzimidazole. | 223 to 229° C | 22 |

2-α-keto benzimidazoles, used as intermediates, may be prepared starting with the selected α-hydroxy benzimidazole (K), which is boiled with an equimolecular amount of selenium dioxide in 200 cm.$^3$ glacial acetic acid after addition of about an equimolecular amount of water. After boiling under reflux for 3 to 20 hours the hot solution is filtered from red selenium (or black selenium). The base (L) is precipitated by addition of aqueous ammonia. In some cases the base crystallizes already from the acetic acid solution. The bases are recrystallized from diluted acetic acid (50%).

TABLE II

| K α-Hydroxy benzyl benzimidazole | L α-Keto benzimidazole | melting point |
|---|---|---|
| 20 g. 2-(α-hydroxy benzyl)-5(6)-methoxy benzimidazole. | 16.5 g. 2-(benzoyl)-5(6)-methoxy benzimidazole. | 172° C. (yellow). |
| 15 g. 2-(4'-chloro-α-hydroxy benzyl)-5(6)-methoxy benzimidazole. | 14 g. 2-(4'-chloro benzoyl)-5(6) benzimidazole. | 168 to 175° C. (yellow-orange). | pounds, in the reaction conditions, reaction temperature and duration, the solvents used, the methods of working up the reaction mixtures and of isolating and purifying the reaction products, and the like may be made by those skilled in the art in accordance with the principles set forth herein and in the claims annexed hereto.

I claim:

1. 1-(diethylamino ethyl)-2-(benzoyl) benzimidazole.
2. 1-(diethylamino ethyl)-2-(4-methoxy benzoyl) benzimidazole.
3. 1-(diethylamino ethyl)-2-[α-oxo-β-(4-methoxy phenyl) ethyl] benzimidazole.
4. 1-(diethylamino ethyl)-2-(diphenyl acetyl) benzimidazole.
5. 1-(diethylamino ethyl) - 2 - [β-phenyl-β-(4-methoxy phenyl) acetyl] benzimidazole.
6. 1-(di-lower alkylamino lower alkyl)-2-(benzoyl) benzimidazole.
7. 1-(di-lower alkylamino lower alkyl)-2-(lower alkoxy benzoyl) benzimidazole.
8. 1-(di-lower alkylamino lower alkyl)-2-(diphenyl acetyl) benzimidazole.
9. A benzimidazole compound selected from the group consisting of the benzimidazole compound of the formula

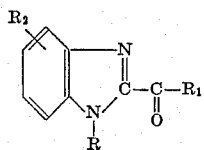

wherein

R is a member selected from the groups consisting of di-(lower alkylamino) lower alkyl, mono-(lower alkylamino) lower alkyl, piperidino lower alkyl, and morpholino lower alkyl;

$R_1$ is a member selected from the group consisting of phenyl, lower alkoxy phenyl, di-(lower alkylamino) phenyl, chloro phenyl, benzyl, lower alkoxy benzyl, α-phenyl benzyl, and α-(lower alkoxy phenyl) benzyl; and $R_2$ is a member selected from the group consisting of hydrogen and lower alkoxy and its pharmaceutically acceptable acid addition salts.

References Cited in the file of this patent

UNITED STATES PATENTS

| | | |
|---|---|---|
| 2,166,198 | Sexton | July 18, 1939 |
| 2,554,736 | Haefliger et al. | May 29, 1951 |
| 2,935,514 | Hoffman et al. | May 3, 1960 |

FOREIGN PATENTS

| | | |
|---|---|---|
| 574,582 | Canada | Apr. 21, 1959 |

OTHER REFERENCES

Hackh's Chemical Dictionary, 2d ed., Philadelphia, Blakiston, 1937, page 21.

Fieser et al.: Organic Chemistry, 2d ed., Boston, Heath, 1950, page 195.

Siegart et al.: J. Amer. Chem. Soc., vol. 79, pages 4391–94 (1957).